United States Patent
Mikawa

(10) Patent No.: US 9,284,891 B2
(45) Date of Patent: Mar. 15, 2016

(54) CONTROL APPARATUS AND CONTROL METHOD FOR VARIABLE VALVE MECHANISM

(71) Applicant: Hitachi Automotive Systems, Ltd., Hitachinaka-shi, Ibaraki (JP)

(72) Inventor: Kentaro Mikawa, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 184 days.

(21) Appl. No.: 14/023,644

(22) Filed: Sep. 11, 2013

(65) Prior Publication Data
US 2014/0074375 A1 Mar. 13, 2014

(30) Foreign Application Priority Data
Sep. 12, 2012 (JP) .................. 2012-200979

(51) Int. Cl.
*F02D 13/02* (2006.01)
(52) U.S. Cl.
CPC ............ *F02D 13/02* (2013.01); *F02D 13/0238* (2013.01); *Y02T 10/18* (2013.01)
(58) Field of Classification Search
CPC . F02D 13/02; F02D 13/0203; F02D 13/0207; F02D 13/0215; F02D 13/0249; F02D 2041/001; F02D 41/221; F01L 1/34; F01L 1/3442; Y02T 10/18; Y02T 10/47
USPC ............ 123/90.1, 90.11, 90.12, 90.15, 90.17; 701/102, 103, 105, 111, 114, 115
See application file for complete search history.

(56) References Cited

U.S. PATENT DOCUMENTS

| | | | |
|---|---|---|---|
| 2002/0010540 A1* | 1/2002 | Moriya et al. ................ | 701/115 |
| 2003/0154966 A1 | 8/2003 | Mianzo et al. | |
| 2006/0037569 A1* | 2/2006 | Minami et al. ............. | 123/90.15 |
| 2006/0169231 A1* | 8/2006 | Fuwa ........................ | 123/90.15 |

(Continued)

FOREIGN PATENT DOCUMENTS

| | | |
|---|---|---|
| JP | 2009-215955 A | 9/2009 |
| JP | 2009-281355 A | 12/2009 |

OTHER PUBLICATIONS

Japanese Office Action issued in counterpart Japanese Application No. 2012-200979 dated Jan. 5, 2016 with partial English-language translation (five (5) pages).

*Primary Examiner* — John Kwon
*Assistant Examiner* — Johnny H Hoang
(74) *Attorney, Agent, or Firm* — Crowell & Moring LLP

(57) ABSTRACT

In a control apparatus for a variable valve mechanism that varies a valve characteristic of an engine valve, in a saturated state in which a calculated manipulated variable of the variable valve mechanism exceeds an outputtable manipulated variable, convergence to a desired position is achieved while suppressing a response delay and an overshoot. If a feedforward manipulated variable calculated according to a reference response exceeds an outputtable limit manipulated variable, a saturating amount (feedforward manipulated variable—limit manipulated variable) is integrated. Upon completion of the integration, the feedforward manipulated variable is corrected based on an FF manipulated variable correction amount, and the integrated value of saturating amount is replaced by a value obtained by subtracting the FF manipulated variable correction amount each time a correction is made. When the integrated value of saturating amount reduces to a predetermined value or less, a control mode is switched to feedback control.

18 Claims, 13 Drawing Sheets

(56) References Cited

U.S. PATENT DOCUMENTS

| | | |
|---|---|---|
| 2006/0174854 A1* | 8/2006 | Yoshizawa .................... 123/348 |
| 2006/0207539 A1* | 9/2006 | Miyakoshi ................. 123/90.17 |
| 2009/0288620 A1* | 11/2009 | Murai et al. ............... 123/90.15 |
| 2009/0288621 A1 | 11/2009 | Mikawa et al. |
| 2009/0292451 A1* | 11/2009 | Murai et al. .................. 701/105 |
| 2010/0036581 A1* | 2/2010 | Ohtsuka ........................ 701/102 |
| 2010/0236523 A1* | 9/2010 | Saruwatari et al. ........... 123/436 |
| 2011/0232595 A1* | 9/2011 | Kokubo et al. ............ 123/90.17 |
| 2013/0066537 A1* | 3/2013 | Saruwatari .................... 701/104 |

* cited by examiner

CONTROL APPARATUS AND CONTROL METHOD FOR VARIABLE VALVE MECHANISM

BACKGROUND OF THE INVENTION

1. Field of the Invention

The present invention relates to a control apparatus and a control method for a variable valve mechanism that varies a valve characteristic of an engine valve (an intake valve or an exhaust valve) of an internal-combustion engine.

2. Description of Related Art

As this type of control apparatus, Japanese Laid-Open Patent Application Publication No. 2009-215955 discloses a technique for suppressing an overshoot in the operation of a variable valve mechanism due to an excessive portion of integration by stopping the calculation of an integral portion of a feedback manipulated variable when an operating speed is saturated, such as in a saturated state in which the manipulated variable of an actuator exceeds an outputtable actual manipulated variable.

However, the abovementioned technique is incapable of eliminating a difference between an actual operating position of the actuator and a desired angle caused by a difference between a feedforward manipulated variable and an actual manipulated variable when the actuator is in the saturated state. Thus, responsiveness is deteriorated with a resultant delay in convergence to a desired position.

SUMMARY OF THE INVENTION

Therefore, in view of the abovementioned problem of the prior art, an object of the present invention to provide a control apparatus and a control method for a variable valve mechanism that suppresses a delay in convergence to a desired position by properly correcting a feedforward manipulated variable thereby to suppress deterioration in responsiveness in a state in which a manipulated variable is saturated.

In order to solve the problem, an apparatus according to an aspect of the present invention is a control apparatus for a variable valve mechanism that varies a valve characteristic of an engine valve. The control apparatus includes: a feedforward manipulated variable calculating unit that calculates a feedforward manipulated variable according to a dynamic characteristic of the variable valve mechanism; an actual manipulated variable calculating unit that calculates an actual manipulated variable that can be output by the variable valve mechanism; a corrective manipulated variable calculating unit that calculates a corrective manipulated variable for correcting a difference between the calculated feedforward manipulated variable and the actual manipulated variable while changing the valve characteristic of the engine valve by controlling the variable valve mechanism; and a feedforward manipulated variable correcting unit that corrects the feedforward manipulated variable according to the corrective manipulated variable after the corrective manipulated variable is calculated.

Furthermore, a method according to an aspect of the present invention is a control method for a variable valve mechanism that varies a valve characteristic of an engine valve. The control method includes the steps of: calculating a feedforward manipulated variable according to the dynamic characteristic of the variable valve mechanism; calculating an actual manipulated variable that can be output by the variable valve mechanism; calculating a corrective manipulated variable for correcting a difference between the calculated feedforward manipulated variable and the actual manipulated variable while changing the valve characteristic of the engine valve by controlling the variable valve mechanism; and correcting the feedforward manipulated variable according to the corrective manipulated variable after the corrective manipulated variable is calculated.

DESCRIPTION OF THE PREFERRED EMBODIMENTS

Figure 1:
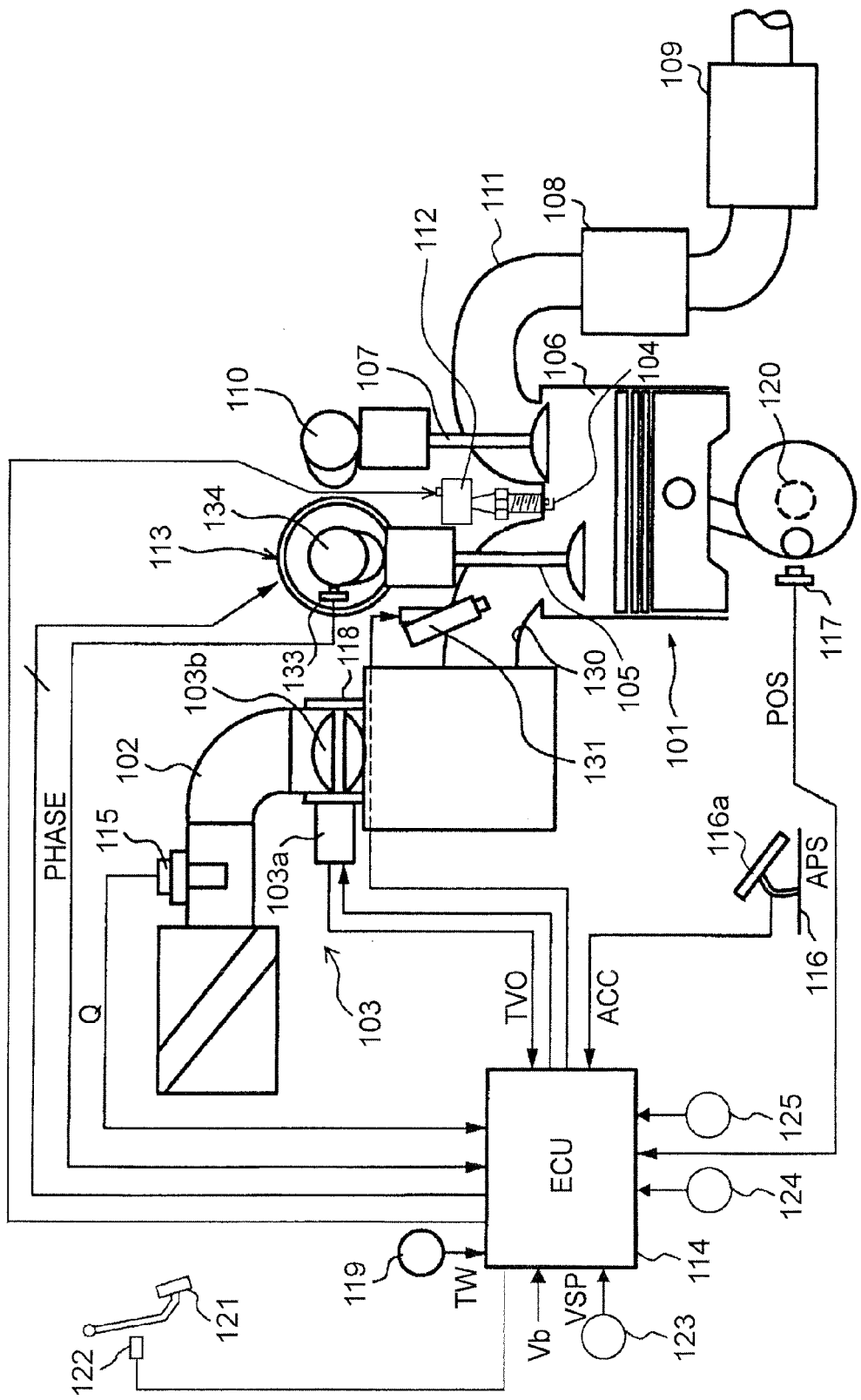
FIG. 1 is a configuration view illustrating a system of an internal-combustion engine in an embodiment.

FIG. 1 is a configuration view of an internal-combustion engine 101 for a vehicle to which a control apparatus according to the present invention has been applied. Internal-combustion engine 101 in the present embodiment is an in-line four-cylinder and four-stroke engine, but internal-combustion engine 101 is not limited thereto.

Referring to FIG. 1, an intake pipe 102 of internal-combustion engine 101 is provided with an electronic control throttle 103 that opens and closes a throttle valve 103b by a throttle motor 103a.

Furthermore, internal-combustion engine 101 draws air into a combustion chamber 106 of each cylinder through electronic control throttle 103 and an intake valve 105.

An intake port 130 of each cylinder is provided with a fuel injection valve 131. Fuel injection valve 131 opens and injects a fuel in response to an injection pulse signal from an engine control unit (ECU) 114 serving as a control apparatus.

The fuel in combustion chamber 106 is spark-ignited by an ignition plug 104 to burn. Each ignition plug 104 is provided with an ignition coil and an ignition module 112 incorporating a power transistor that controls the power supplied to the ignition coil.

The combustion gas in combustion chamber 106 flows into an exhaust pipe 111 through an exhaust valve 107. A front catalytic converter 108 and a rear catalytic converter 109 provided in exhaust pipe 111 purify the exhaust gas flowing through exhaust pipe 111.

An intake cam shaft 134 and an exhaust cam shaft 110 are integrally provided with cams, and actuate intake valve 105 and exhaust valve 107, respectively, by the cams.

The valve timing of intake valve 105 is variably controlled by a variable valve timing mechanism (electric VTC) 113 that relatively rotates intake cam shaft 134 by using an electric motor (actuator) with respect to a crankshaft 120.

Electric VTC 113 is constituted of the elements described below, as illustrated in FIG. 2 to FIG. 7. A timing sprocket 1 is a driving rotator that is rotatively driven by crankshaft 120 of the internal-combustion engine. Intake cam shaft 134 rotatably supported on a cylinder head through a bearing 44 is rotated by a rotative force transmitted from timing sprocket 1. A covering member 3 is disposed in front of timing sprocket 1 and fixed to a chain cover 40, which is a fixed member, by bolts. A phase changing mechanism 4 is a changing mechanism, which is disposed between timing sprocket 1 and intake cam shaft 134 and changes the relative rotation phases of timing sprocket 1 and intake cam shaft 134, according to an engine operating condition.

Entire timing sprocket 1 is formed of a ferrous metal in one piece and constituted of an annular sprocket main body 1a having a stepped-diameter inner peripheral surface, and a gear 1b which is integrally provided on the outer periphery of sprocket main body 1a and receives a rotational force from a crankshaft through a wound timing chain 42. Furthermore, timing sprocket 1 is rotatably supported on intake cam shaft 134 by a third ball bearing 43, which is a third bearing interposed between a circular groove 1c formed in the inner periphery of sprocket main body 1a and the outer periphery of a thick flange 2a provided integrally with the front end portion of intake cam shaft 134.

Figure 5:
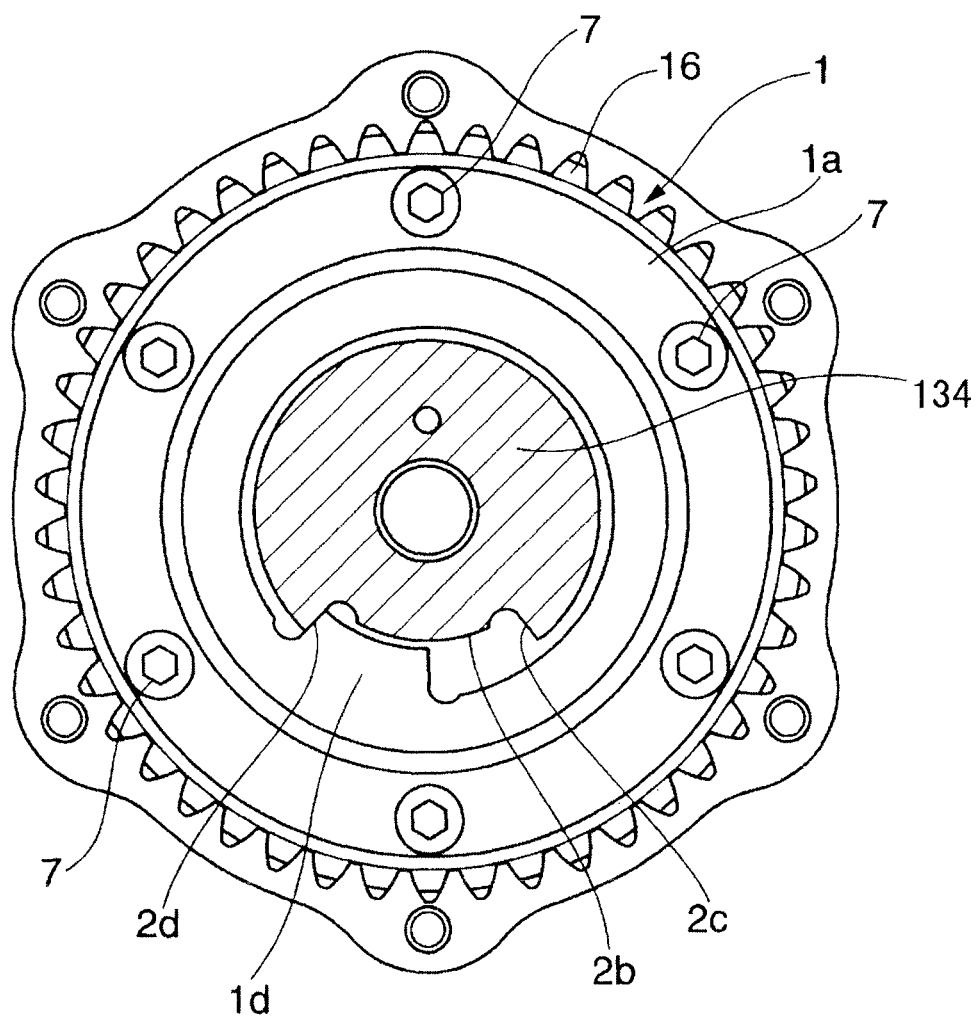
FIG. 5 is a sectional view taken on line B-B of FIG. 2.

An annular protrusion 1e is integrally formed on the outer peripheral edge of the front end portion of sprocket main body 1a. At the front end portion of sprocket main body 1a, an annular member 19 having internal teeth 19a, which are corrugated meshing portions, formed on the inner periphery thereof is coaxially positioned on the inner periphery side of annular protrusion 1e. Annular member 19 and a large-diameter annular plate 6 are fastened together with a bolt 7. Furthermore, a stopper convex section 1d, which is an arc-shaped engagement section, is formed to have a predetermined length along the circumferential direction in a portion of the inner peripheral surface of sprocket main body 1a, as illustrated in FIG. 5.

A cylindrical housing 5 protruding in the front, covering a speed reducer 8, which will be discussed later, of phase changing mechanism 4 and the constituent members of an electric motor 12, is fixed by a bolt 11 to the outer periphery of plate 6 on a front end side.

Housing 5 integrally formed using a ferrous metal functions as a yoke and has, on the front end side thereof, a holding portion 5a, which is shaped like an annular plate and made integral with housing 5. Furthermore, the entire outer periphery of housing 5, including holding portion 5a, is disposed to be covered by covering member 3 with a predetermined gap provided therebetween.

Intake cam shaft 134 has, on the outer periphery thereof, two driving cams per cylinder to open intake valve 105, and a driven member 9, which is a driven rotator, is connected to the front end portion of intake cam shaft 134 from an axial direction by a cam bolt 10. Furthermore, as illustrated in FIG. 5, flange 2a of intake cam shaft 134 has a stopper concave groove 2b, which serves as a locking section in which stopper convex section 1d of sprocket main body 1a locks and which is formed in the circumferential direction. Stopper concave groove 2b is formed in an arc shape of a predetermined length in the circumferential direction, and both edges of stopper convex section 1d that circularly moves within the range of the predetermined length abut against opposing surfaces 2c and 2d in the circumferential direction, thereby restricting the relative rotational position of intake cam shaft 134 on a maximum advance angle side or a maximum retard angle side relative to timing sprocket 1.

In cam bolt 10, a flange-shaped seating surface 10c is integrally formed with an end edge of a head portion 10a on a shank 10b side, and an external thread portion, which is screwed to an internal thread portion formed in the direction of an internal axis from an end portion of intake cam shaft 134, is formed on the outer periphery of shank 10b.

Figure 3:
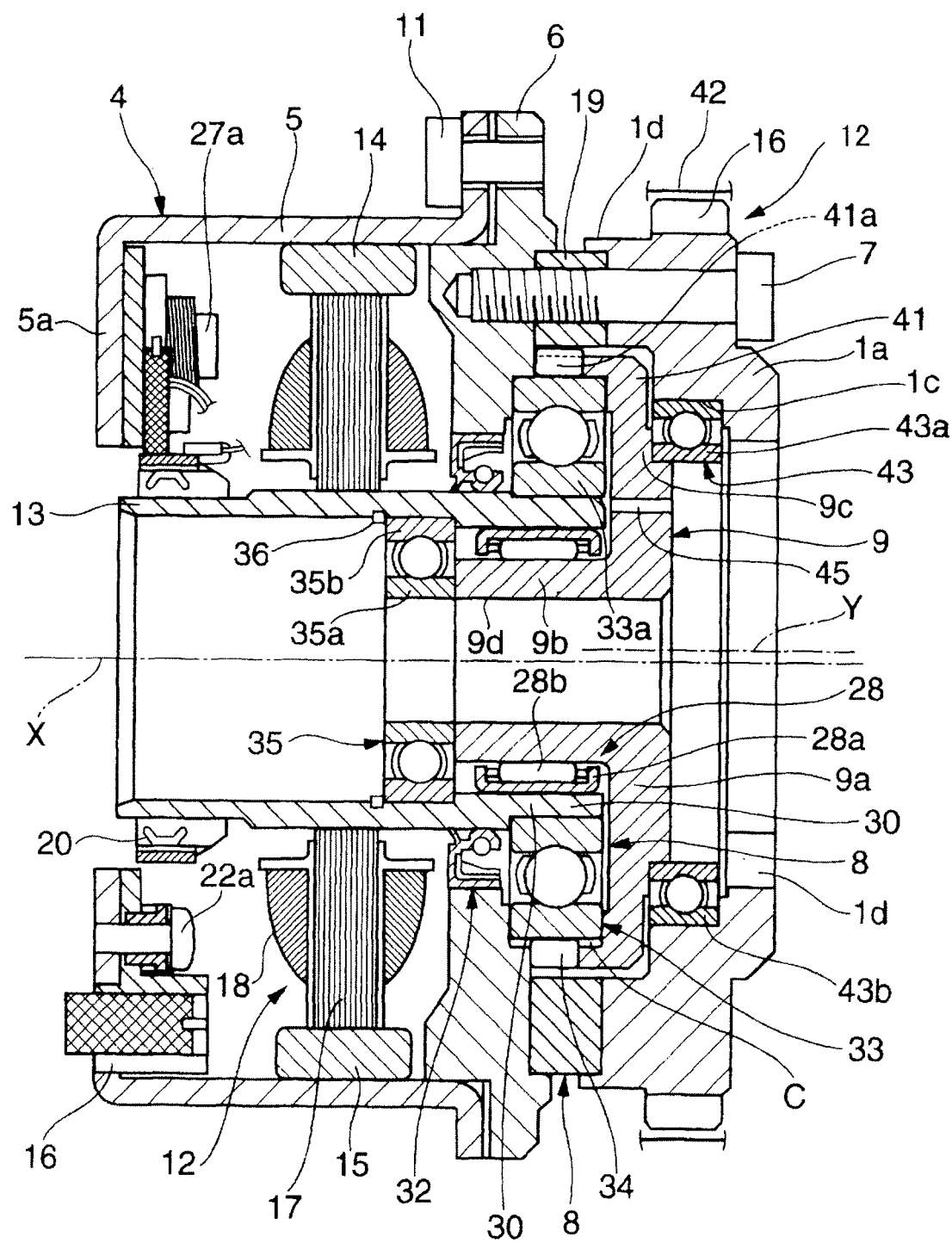
FIG. 3 is an enlarged sectional view of an essential section of a major constituent member in an electric variable valve timing mechanism.
Figure 4:
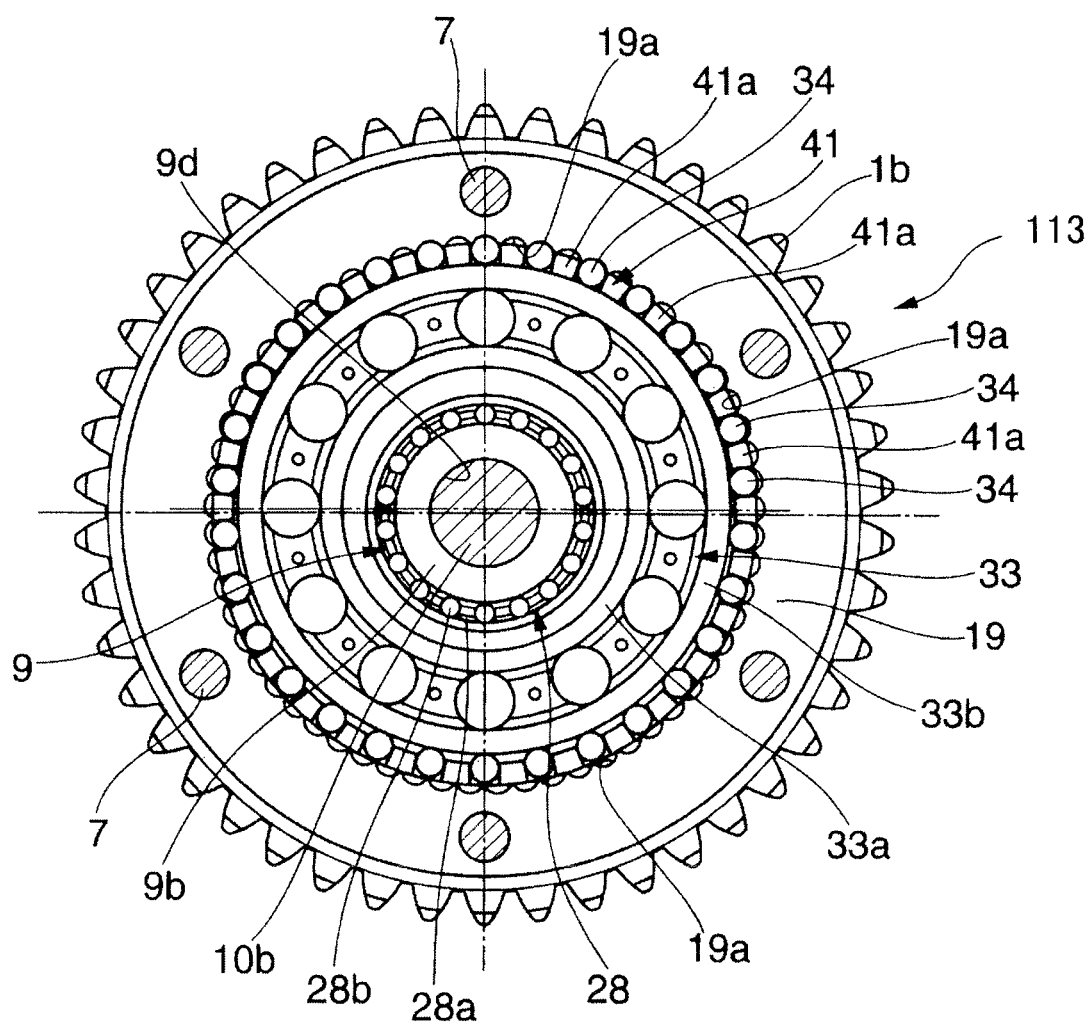
FIG. 4 is a sectional view taken on line A-A of FIG. 2.

Driven member 9 is integrally formed using a ferrous metal material and constituted of a disc portion 9a formed on the front end side thereof and a cylindrical portion 9b, which is cylindrically shaped and integrally formed on the rear end side thereof, as illustrated in FIG. 3.

An annular stepped protrusion 9c, which has an outside diameter that is substantially the same as that of flange 2a of intake cam shaft 134, is provided integrally with disc portion 9a at substantially a central position in the radial direction of the rear end surface. The outer peripheral surface of stepped protrusion 9c and the outer peripheral surface of flange 2a are disposed to be inserted in the inner periphery of an inner ring 43a of third ball bearing 43. An outer ring 43b of third ball bearing 43 is fixed by press fitting to the inner peripheral surface of circular groove 1c of sprocket main body 1a.

Furthermore, as illustrated in FIG. 2 to FIG. 6, a cage 41, which retains a plurality of rollers 34 (to be discussed hereinafter), is provided integrally with the outer peripheral portion of disc portion 9a. Cage 41 is formed to project from the outer periphery of disc portion 9a in the same direction as that of cylindrical portion 9b, and formed of a plurality of long and narrow protrusions 41a substantially equidistantly spaced with predetermined gaps in the circumferential direction.

In cylindrical portion 9b, an insertion hole 9d in which shank 10b of cam bolt 10 is inserted is formed at the center thereof, and a first needle bearing 28, which is to be discussed later and which is a first bearing, is provided on the outer periphery side, as illustrated in FIG. 3.

Figure 2:
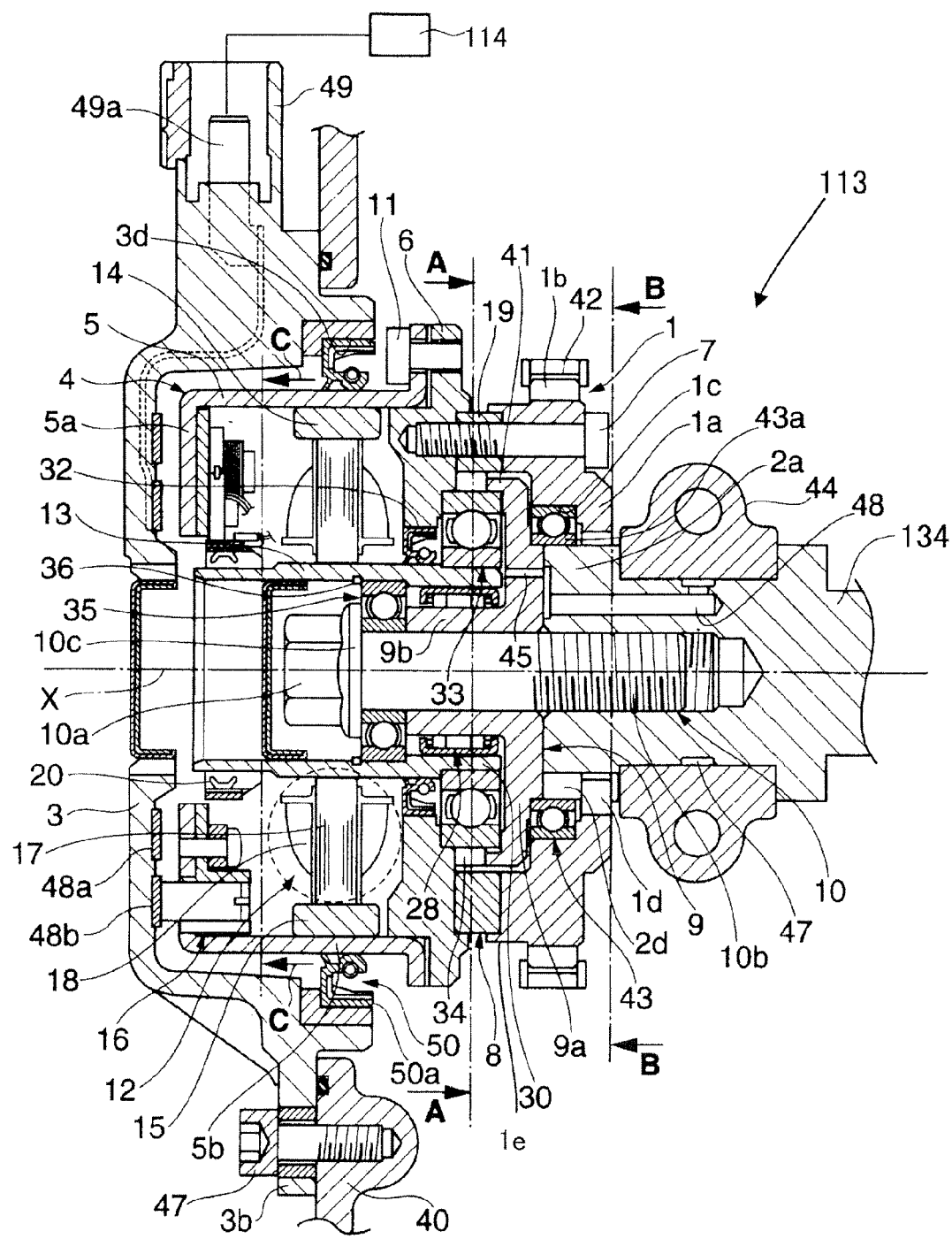
FIG. 2 is a longitudinal sectional view illustrating a variable valve timing mechanism in the embodiment.
Figure 6:
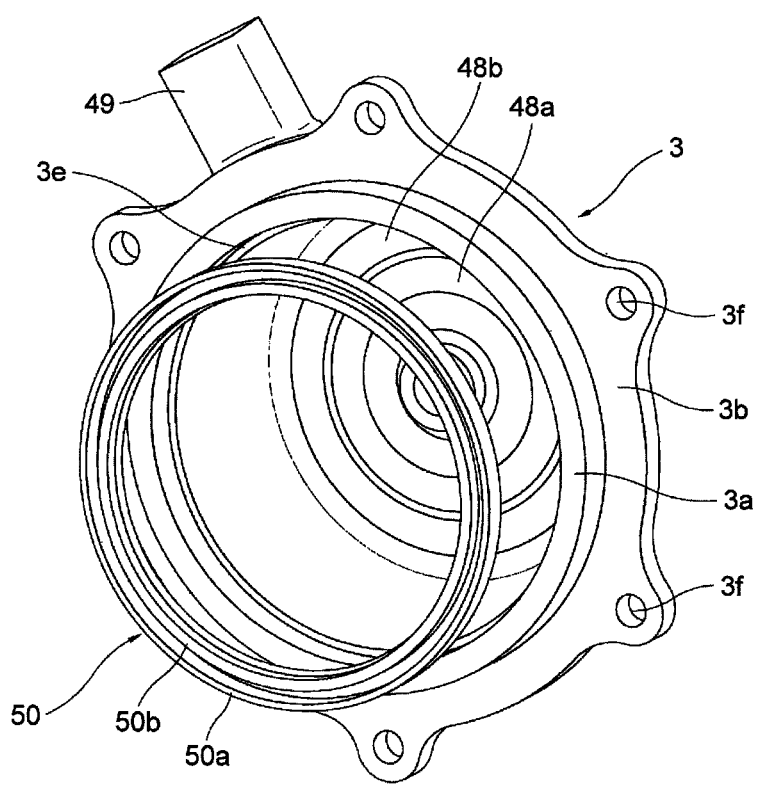
FIG. 6 is an exploded perspective view of a cover and a first oil seal for the variable valve timing mechanism.

Covering member 3 is formed in one piece by using a relatively thick synthetic resin material and constituted of a cover main body 3a projecting in a cup shape and a bracket 3b formed integrally with the outer periphery of the rear end portion of cover main body 3a, as illustrated in FIG. 2 and FIG. 6.

Cover main body 3a is disposed to cover the front end side of phase changing mechanism 4, that is, to cover substantially the entire rear end side thereof from a retaining portion 5b in the axial direction of housing 5 with a predetermined gap provided therebetween. Meanwhile, bracket 3b has six substantially circular-shaped bosses, each of which has a bolt insertion hole 3f.

Furthermore, as illustrated in FIG. 2, covering member 3 has bracket 3b fixed to chain cover 40 through a plurality of bolts 47, and two inner and outer slip rings 48a and 48b are embedded in and fixed to the inner peripheral surface of a front end portion 3c of cover main body, the inner end surfaces of slip rings 48a and 48b being exposed. Furthermore, the upper end portion of covering member 3 is provided therein with a connector 49 to which a connector terminal 49a is connected through slip rings 48a and 48b and a conductive member. Through the intermediary of a control unit 21, power is supplied from a battery power source (not illustrated) to connector terminal 49a or the supply of power thereto is cut off.

Furthermore, as illustrated in FIG. 2, a large-diameter first oil seal 50, which is a sealing member, is interposed between the inner peripheral surface on the rear end side of cover main body 3a and the outer peripheral surface of housing 5. First oil seal 50 has a substantially U-shaped cross section and has a core metal buried in a base material of synthetic rubber. An annular base portion 50a on the outer periphery side is fixed by being fitted in a circular groove 3d formed in the inner peripheral surface of the rear end portion of covering member 3. Furthermore, a seal surface 50b, which is in contact with the outer peripheral surface of housing 5, is integrally formed on the inner peripheral surface of annular base portion 50a.

Phase changing mechanism 4 is constituted of electric motor 12 disposed on the front end side on substantially the same axis as that of intake cam shaft 134 and speed reducer 8, which reduces the rotation speed of electric motor 12 and transmits the reduced rotation speed to intake cam shaft 134.

As illustrated in FIG. 2 and FIG. 3, electric motor 12, which is a DC motor with a brush, includes housing 5, which is a yoke rotating integrally with timing sprocket 1, a motor shaft 13, which is an output shaft rotatably provided in housing 5, a pair of semicircular-shaped permanent magnets 14 and 15 fixed to the inner peripheral surface of housing 5, and a stator 16 fixed to the inner bottom surface of housing holding portion 5a.

Motor shaft 13 formed in a cylindrical shape functions as an armature, and an iron-core rotor 17 having a plurality of poles is fixed to the outer periphery thereof substantially at the central position in the axial direction. An electromagnetic coil 18 is wound around the outer periphery of the iron-core rotor 17. Furthermore, a commutator 20 is fixed by press fitting to the outer periphery of the front end portion of motor shaft 13. Electromagnetic coil 18 is connected to the segments of commutator 20, the number of the segments being the same as the number of poles of iron-core rotor 17.

Figure 7:
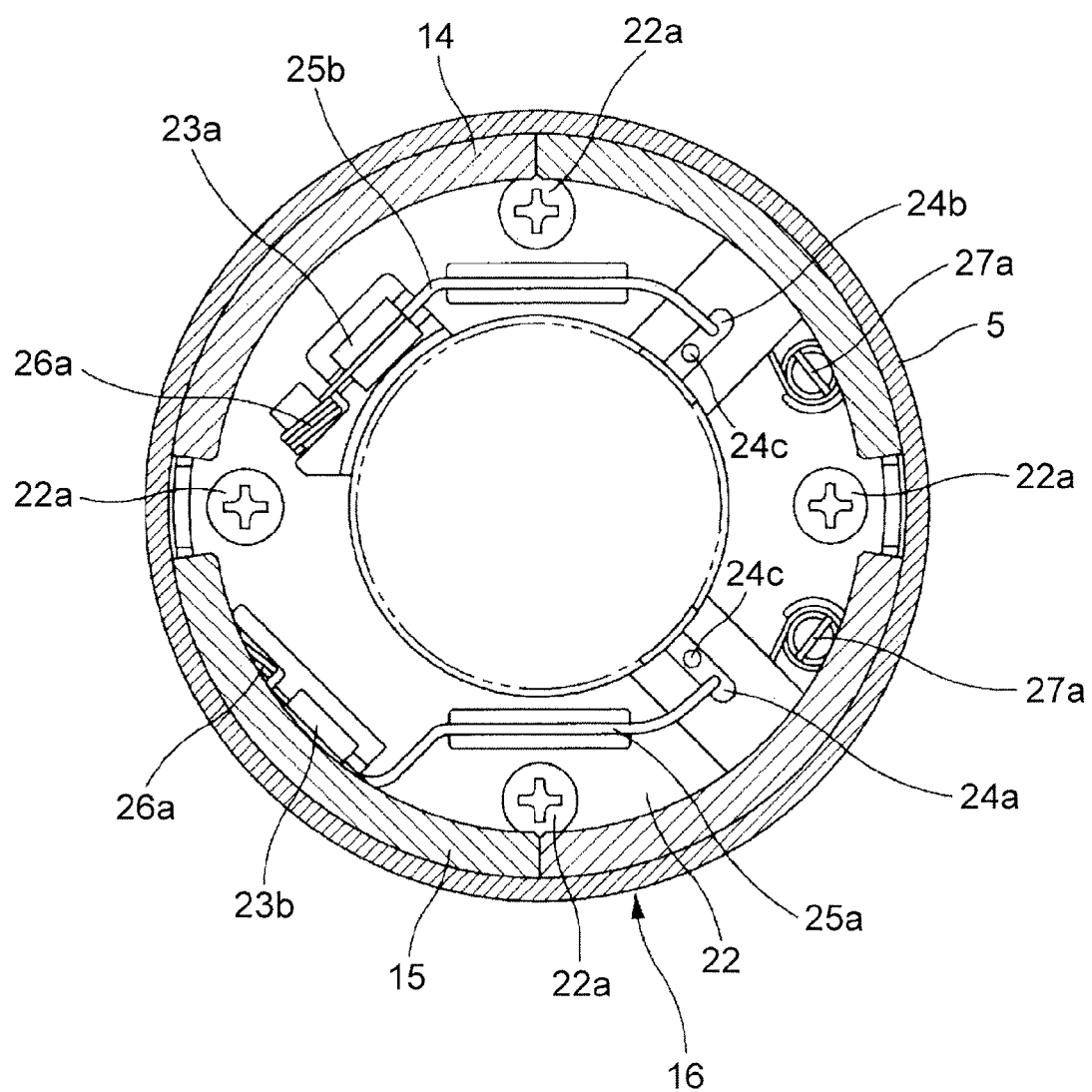
FIG. 7 is a sectional view taken on line C-C of FIG. 2.

As illustrated in FIG. 7, stator 16 is mainly constituted of an annular plate-shaped resin holder 22, two first brushes 23a and 23b, and second brushes 24a and 24b. Annular plate-shaped resin holder 22 is fixed to the inner bottom wall of holding portion 5a by four screws 22a. Two first brushes 23a and 23b penetrate resin holder 22 and holding portion 5a in the axial direction, and are located on the inner side and the outer side in the circumferential direction, and the distal surfaces of which are in sliding contact with the pair of slip rings 48a and 48b to receive electric power. Second brushes 24a and 24b is retained to be movable forward and backward toward the inner periphery side of resin holder 22 and the arc-shaped distal end portion of which is in sliding contact with the outer peripheral surface of commutator 20.

First brushes 23a and 23b and second brushes 24a and 24b are connected by pigtail harnesses 25a and 25b and urged toward slip rings 48a and 48b and toward commutator 20 by the spring forces of torsion springs 26a and 27a, which are in elastic contact with the brushes.

Motor shaft 13 is rotatably supported by the outer peripheral surface of shank 10b of head portion 10a of cam bolt 10 through the intermediary of a needle bearing 28, which is a first bearing, and a fourth ball bearing 35, which is a bearing disposed beside needle bearing 28 in the axial direction. Furthermore, a cylindrical eccentric shaft 30 constituting a part of speed reducer 8 is provided integrally with the rear end portion of motor shaft 13 on intake cam shaft 134 side.

First needle bearing 28 is constituted of a cylindrical retainer 28a, which is press-fitted to the inner peripheral surface of eccentric shaft 30, and needle rollers 28b, which are a plurality of rolling elements rotatably retained inside retainer 28a. Needle rollers 28b roll on the outer peripheral surface of cylindrical portion 9b of driven member 9.

An inner ring 35a of fourth ball bearing 35 is fixed by being sandwiched between the front end edge of cylindrical portion 9b of driven member 9 and seating surface 10c of cam bolt 10, while an outer ring 35b thereof is supported and positioned in the axial direction between the stepped portion formed on the inner circumference of motor shaft 13 and a snap ring 36, which is a retaining ring.

Furthermore, a second oil seal 32, which is a friction member for preventing a lubricant from leaking from speed reducer 8 into electric motor 12, is provided between the outer peripheral surface of motor shaft 13 (eccentric shaft 30) and the inner peripheral surface of plate 6. The inner peripheral portion of second oil seal 32 is in elastic contact with the outer peripheral surface of motor shaft 13 thereby to impart frictional resistance to the rotation of motor shaft 13.

As illustrated in FIG. 2 and FIG. 3, speed reducer 8 is mainly constituted of eccentric shaft 30, which carries out an eccentric rotational movement, a second ball bearing 33, which is a second bearing provided on the outer periphery of eccentric shaft 30, rollers 34 provided on the outer periphery of second ball bearing 33, cage 41 that allows rollers 34 to move in the radial direction while retaining rollers 34 in the rolling direction thereof, and driven member 9 formed integrally with cage 41.

In eccentric shaft 30, a shaft center Y of a cam surface formed on the outer periphery surface is slightly offset in the radial direction from a shaft center X of motor shaft 13. Second ball bearing 33, rollers 34 and the like are constituted as a planetary engaging section.

Second ball bearing 33 is formed to have a large diameter and disposed such that it entirely overlaps first needle bearing 28 in the radial position. An inner ring 33a is fixed to the outer peripheral surface of eccentric shaft 30 by press fitting, and rollers 34 are always abutted against the outer peripheral surface of an outer ring 33b. Furthermore, an annular gap C is formed on the outer periphery side of outer ring 33b. Gap C allows entire second ball bearing 33 to move, i.e., to eccentrically move, in the radial direction as eccentric shaft 30 eccentrically rotates.

Rollers 34 are adapted to fit in internal teeth 19a of annular member 19 while moving in the radial direction as second ball bearing 33 eccentrically moves and to oscillate in the radial direction while being guided in the circumferential direction by protrusions 41a of cage 41.

A lubricant is supplied into speed reducer 8 by a lubricant supplying unit. As illustrated in FIG. 2, the lubricant supplying unit is formed in bearing 44 of the cylinder head and constituted of an oil supply passage 47, through which a lubricant is supplied from a main oil gallery (not illustrated), an oil supply hole 48, which is formed in the direction of the internal axis of intake cam shaft 134 and which is in communication with oil supply passage 47 through a groove, a small-diameter oil supply hole 45, which is formed to penetrate in the direction of the internal axis of driven member 9, one end of which opens to oil supply hole 48 and the other end of which opens in the vicinity of first needle bearing 28 and second ball bearing 33, and three large-diameter oil discharge holes (not illustrated), which are also formed to penetrate driven member 9.

The following will describe the operation of electric VTC 113. First, when the crankshaft of the engine is rotatively driven, timing sprocket 1 rotates through timing chain 42. The rotational force causes electric motor 12 to synchronously rotate through the intermediary of housing 5, annular member 19 and plate 6. Meanwhile, the rotational force of annular member 19 is transmitted from rollers 34 to intake cam shaft 134 through the intermediary of cage 41 and driven member 9. Thus, the cam of intake cam shaft 134 opens or closes the intake valve.

To change the rotation phase of intake cam shaft 134 (i.e., the valve timing of intake valve 105) by driving electric VTC 113, electromagnetic coil 17 of electric motor 12 is energized from control unit 21 mainly through slip rings 48a and 48b. This rotatively drives motor shaft 13, and the rotational force is reduced through speed reducer 8 before being transmitted to intake cam shaft 134.

More specifically, when eccentric shaft 30 is eccentrically rotated as motor shaft 13 rotates, each of rollers 34 rolls over one of internal teeth 19a of annular member 19 to move onto adjacent internal tooth 19a by being guided in the radial direction by protrusions 41a of cage 41 each time motor shaft 13 rotates. Rollers 34 sequentially repeat the movement to roll in the circumferential direction. The rolling movement of rollers 34 causes the rotational force to be transmitted to driven member 9 while the rotational speed of motor shaft 13 is reduced. At this time, the speed reduction rate can be arbitrarily set according to, for example, the number of rollers 34.

Thus, intake cam shaft 134 carries out forward and reverse relative rotation with respect to timing sprocket 1 to switch the relative rotation phase, thereby conducting control to change open and close timing of the intake valve to the advance angle side or the retard angle side.

The maximum position (i.e., the angular position) of the forward and reverse relative rotation of intake cam shaft 134 with respect to timing sprocket 1 is restricted by a side surface of stopper convex section 1d coming in contact with one of opposing surfaces 2c and 2d of stopper concave groove 2b.

More specifically, driven member 9 rotates in the same direction as the rotational direction of timing sprocket 1 when eccentric shaft 30 eccentrically rotates, so that one side surface of stopper convex section 1d comes in contact with opposing surface 2c on one side of stopper concave groove 2b, thereby restricting further rotation in the same direction. This causes the relative rotation phase of intake cam shaft 134 with respect to timing sprocket 1 to be changed to a maximum on the advance angle side.

Meanwhile, driven member 9 rotates in a direction opposite from the rotational direction of timing sprocket 1, so that the other side surface of stopper convex section 1d comes in contact with opposing surface 2d on the other side of stopper concave groove 2b thereby restricting further rotation in the same direction. This causes the relative rotation phase of intake cam shaft 134 with respect to timing sprocket 1 to be changed to a maximum on the retard angle side.

Referring to FIG. 1, ECU 114, which includes a microcomputer, carries out calculation according to a program stored in a memory beforehand so as to control electronic control throttle 103, fuel injection valve 131, ignition module 112 and the like.

ECU 114 receives detection signals from various sensors, such as an accelerator opening sensor 116 which detects the opening of an accelerator pedal 116a (the opening of the accelerator) ACC, an airflow sensor 115 which detects intake air amount Q of internal-combustion engine 101, a crank angle sensor (rotation sensor) 117 which outputs pulsed rotation signals (unit crank angle signals) POS according to the rotation of crankshaft 120 which is an output shaft of internal-combustion engine 101, a throttle sensor 118 which detects an opening degree TVO of throttle valve 103b, a water temperature sensor 119 which detects the temperature of cooling water TW of internal-combustion engine 101, a cam sensor 133 which outputs pulsed cam signals PHASE according to the rotation of intake cam shaft 134, a brake switch 122 which turns on in a brake mode in which the driver of the vehicle has stepped on a brake pedal 121, and a vehicle speed sensor 123 which detects a traveling speed of the vehicle (vehicle speed) VSP, the vehicle being powered by internal-combustion engine 101.

ECU 114 also receives on and off signals of an ignition switch 124 which is a main switch for actuating and stopping internal-combustion engine 101, on and off signals of a starter switch 125, and a voltage Vb of a battery. A detection value of voltage Vb of the battery is used as the detection value of an outputtable limit manipulated variable of electric motor 12 driven by using the battery as the power source thereof.

The control of electric VTC 113 will now be described below.

Figure 8:
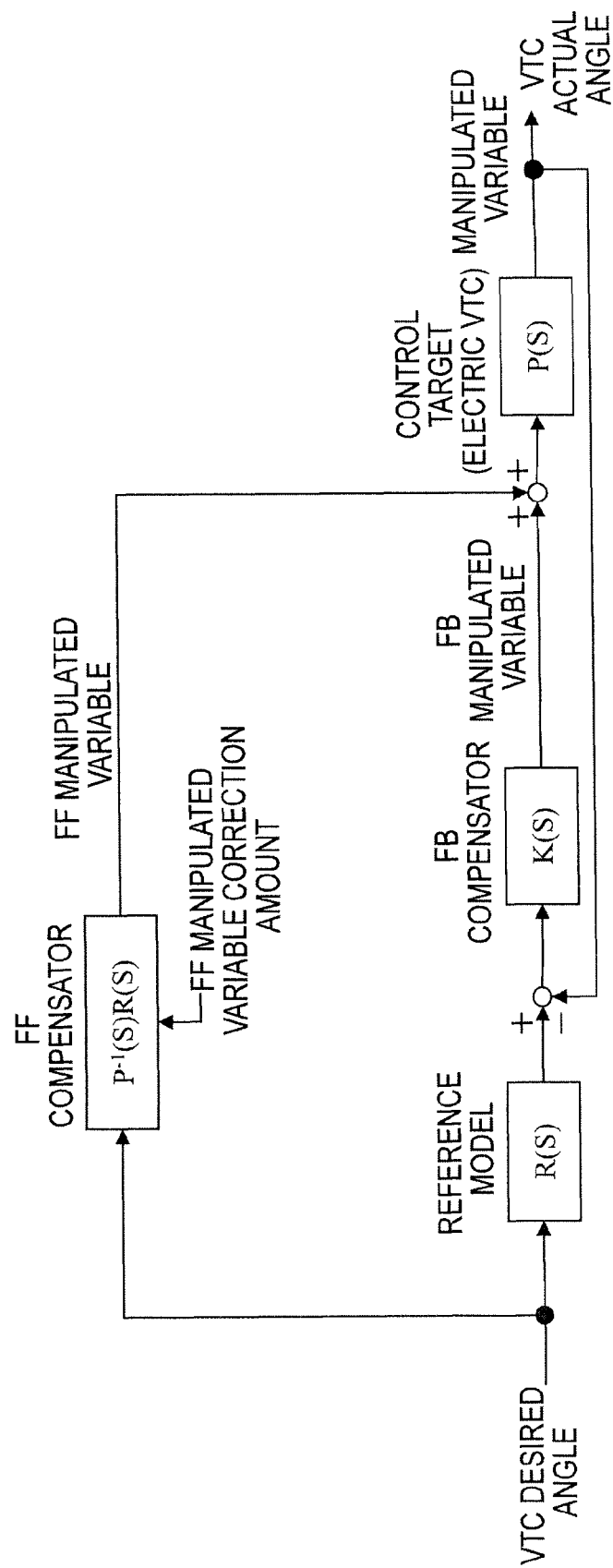
FIG. 8 is a control block view illustrating the variable valve timing mechanism.

FIG. 8 illustrates a control block view. The basic control based on the control block view will be described.

A reference model R(s) is set beforehand as a model which permits stable responses according to a dynamic characteristic (equation of motion) of electric VTC 113.

A feedforward compensator calculates a feedforward manipulated variable $FF(s)=P^{-1}(s)R(s)$ for causing electric VTC 113 to respond according to the reference model.

The feedback compensator calculates a feedback manipulated variable FB(s) based on a difference between a value of the reference model and an actual VTC angle of electric VTC 113.

A final manipulated variable obtained by adding the feedforward manipulated variable FF(s) and the feedback manipulated variable FB(s) is output to electric VTC 113, which is to be controlled.

In the model reference control configured as described above, if an actual transfer characteristic P'(s) of the control target, namely, electric VTC 113, and a modeled control target transfer characteristic P(s) coincide with each other, then a response of electric VTC 113 should follow a reference model response by only using the feedforward manipulated variable FF(s).

Actually, however, when starting the engine (starting up a starter) or at a low temperature or the like, battery voltage Vb drops, thus restricting an outputtable limit manipulated variable (motor torque). As a result, a response based on the reference model will not be obtained, leading to delayed convergence to a desired angle.

Hence, the feedforward compensator corrects a feedforward manipulated variable according to a correction amount set based on a feedforward manipulated variable and a limit manipulated variable thereby to suppress the delay of convergence to the desired angle. During the correction of the feedforward manipulated variable, the feedback control is interrupted, i.e., the feedback manipulated variable supplied by the feedback compensator is set to zero).

Figure 9:
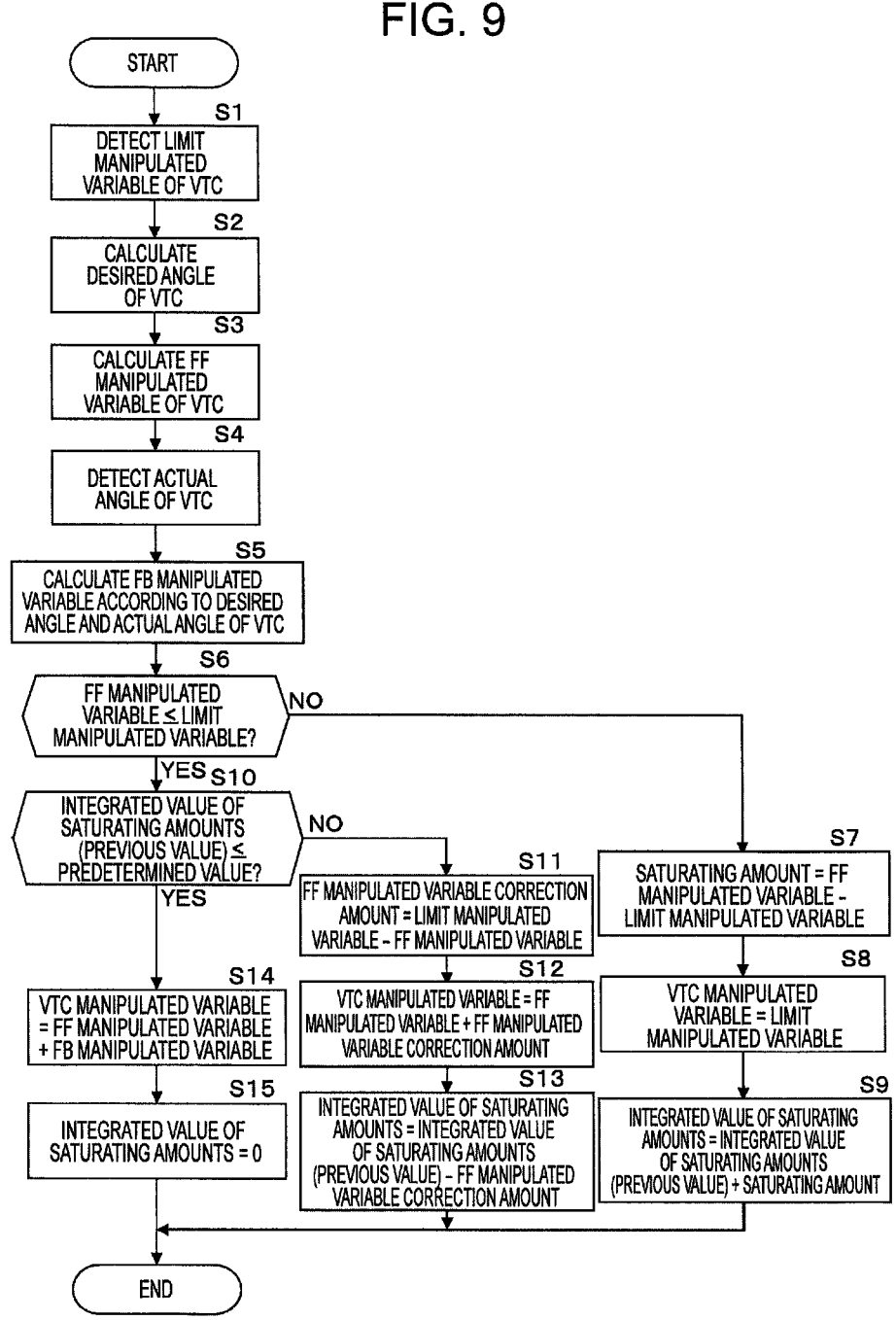
FIG. 9 is a flowchart of a first embodiment of the valve timing control by the variable valve timing mechanism.

FIG. 9 illustrates a flowchart according to a first embodiment in which electric VTC 113 is controlled while correcting a feedforward manipulated variable.

In step 1, an actual manipulated variable (a limit manipulated variable) that can be output to electric VTC 113 (electric motor 12), which is to be controlled, is detected. More specifically, as described above, voltage Vb of the battery, which is the power source for driving electric VTC 113 (electric motor 12), is detected as the limit manipulated variable. As described above, battery voltage Vb (the limit manipulated variable) drops when, for example, starting the engine (starting up the starter) or at a low temperature.

In step 2, a VTC desired angle, i.e., a desired rotation phase of intake cam shaft 134 (a desired valve timing of intake valve 105) controlled by electric VTC 113 is calculated.

In step 3, the feedforward manipulated variable corresponding to the VTC desired angle is calculated. This is calculated as the feedforward manipulated variable $FF(s) = P^{-1}(s)R(s)$ for a response based on the reference model, as described above.

In step 4, a VTC actual angle, i.e., an actual rotation phase of intake cam shaft 134 (an actual valve timing of intake valve 105) is detected by using cam signal PHASE from cam sensor 133 and rotation signal POS from the crank angle sensor.

In step 5, based on the difference between the VTC desired angle and VTC actual angle, the feedback manipulated variable is calculated by PID control or the like.

In step 6, it is determined whether the feedforward manipulated variable is the limit manipulated variable or less.

If it is determined that the feedforward manipulated variable exceeds the limit manipulated variable, the process proceeds to step 7 in which a value obtained by subtracting the limit manipulated variable from the feedforward manipulated variable is determined as a corrective manipulated variable for correcting the feedforward manipulated variable and calculated as a saturating amount (a manipulated variable portion that cannot be output) by which the feedforward manipulated variable exceeds the limit manipulated variable which is the actual manipulated variable.

In step 8, the VTC manipulated variable is output as the limit manipulated variable to electric VTC 113 (electric motor 12).

In step 9, the saturating amount is integrated. More specifically, the current saturating amount calculated in step 7 is added to the previous value of the integrated value of the saturating amount to thereby update the integrated value of the saturating amount.

Thus, in the saturated state in which a feedforward manipulated variable exceeds a limit manipulated variable, the saturating amount, which is the difference between the feedforward manipulated variable and the limit manipulated variable, is integrated while driving electric VTC 113 by outputting the limit manipulated variable. The integrated value of saturating amounts is the total amount of the manipulated variable portions that cannot be output with respect to the feedforward manipulated variable that should have been output, and therefore used as the corrective manipulated variable for correcting the feedforward manipulated variable in order to recover for a response delay, which is caused by the manipulated variable that cannot be output, after completion of the integration of the saturating amounts.

If it is determined that the feedforward manipulated variable calculated in step 3 is reduced to the limit manipulated variable or less in step 6, the process proceeds to step 10 to switch the operation to the control for correcting the feedforward manipulated variable according to the integrated value of saturating amounts obtained during the period of the saturated state.

In step 10, it is determined whether the integrated value of saturating amounts is reduced to a predetermined value or less due to the processing of subtracting the integrated value of saturating amounts, which will be discussed hereinafter. The predetermined value may be set to zero and a correction by increasing the feedforward manipulated variable, which will be discussed hereinafter, may be carried out so that the integrated value of saturating amounts reaches zero, or may be set to a value that makes it possible to presume that the response delay caused by an insufficient initial feedforward manipulated variable has been corrected by the correction by increasing the feedforward manipulated variable and the actual angle of VTC has been brought close to a desired angle.

If it is determined that the integrated value of saturating amounts exceeds the predetermined value, the process proceeds to step 11 in which the correction amount of the feedforward manipulated variable (FF manipulated variable correction amount) is calculated as the value obtained by subtracting the feedforward manipulated variable from the limit manipulated variable.

In step 12, the VTC manipulated variable is calculated by adding the FF manipulated variable correction amount calculated in step 11 to the feedforward manipulated variable. The value becomes the limit manipulated variable (meaning that, in the first embodiment, the VTC manipulated variable may be equal to the limit manipulated variable, without the calculation in the present step). In other words, in the present embodiment, the correction is made to maintain the limit manipulated variable such that shortage of the feedforward manipulated variable that has occurred in the saturated state is filled to a maximum.

In step 13, the integrated value of saturating amounts is updated to the value obtained by subtracting the FF manipulated variable correction amount used at the present time from the previous value thereof.

If it is determined that the integrated value of saturating amounts is subtracted each time the feedforward manipulated variable is corrected and the integrated value of saturating amounts is the predetermined value or less (the value obtained by subtracting the integrated value of feedforward manipulated variables from the integrated value of saturating amounts upon completion of the integration of saturating amounts has reduced to the predetermined value or less) in step 10, the process proceeds to step 14 to start regular feedback control. More specifically, the VTC manipulated variable is calculated as a value obtained by adding a feedback manipulated variable to a feedforward manipulated variable.

In step 15, the integrated value of saturating amounts is reset to zero upon completion of the correction of the feedforward manipulated variable.

The operation of the present embodiment will now be described.

As described above, in a case in which the battery voltage becomes low when starting up the engine by driving the starter or when temperature is low, there is a possibility that driving the VTC leads to the occurrence of the saturated state, in which a feedforward manipulated variable set to allow a reference response characteristic to be obtained exceeds an outputtable limit manipulated variable.

Figure 10:
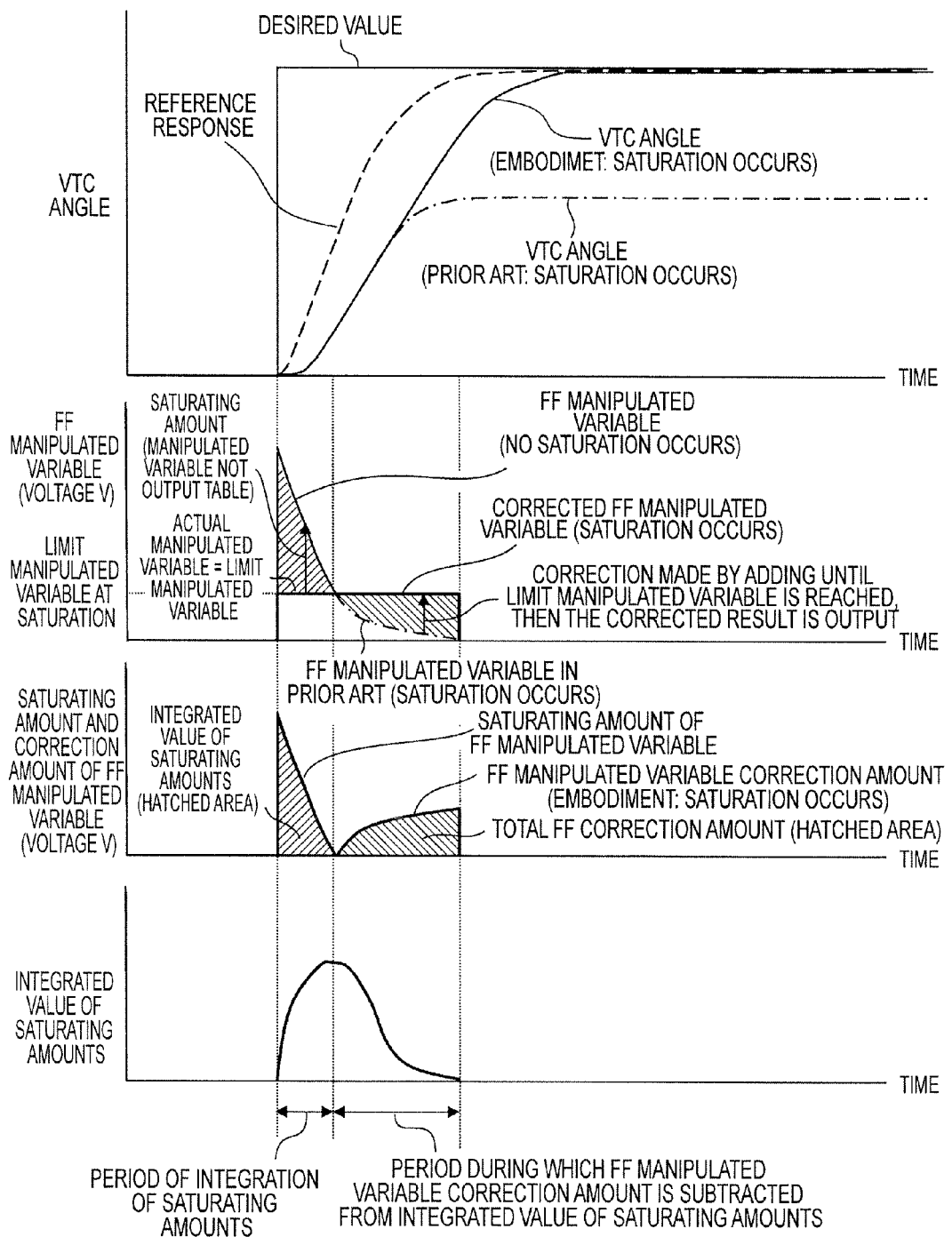
FIG. 10 is a time chart illustrating changes in various state amounts at the timing of the valve timing control.

In such a saturated state, as illustrated in FIG. 10, a response delay occurs at an early phase of control, during which the control is carried out with a limit manipulated variable that is smaller than the feedforward manipulated variable of the VTC. However, the delay during the period can be controlled to a minimum by maintaining the limit manipulated variable. Meanwhile, during the period, the saturating amount (the manipulated variable portion that cannot be output) by which the feedforward manipulated variable exceeds the limit manipulated variable is integrated, and the integrated value of saturating amounts upon completion of the integration is calculated as the corrective manipulated variable for correcting the feedforward manipulated variable.

Then, after the feedforward manipulated variable based on the reference response characteristic becomes smaller than the limit manipulated variable, the feedforward manipulated variable is increased to make a correction by using the FF manipulated variable correction amount. The correction is continued until the total correction amount reaches a value in the vicinity of the integrated value of saturating amounts upon completion of the integration of the saturating amounts, i.e., the corrective manipulated variable for correcting the feedforward manipulated variable.

Thus, the total amount of the manipulated variable portions that cannot be output in the early phase of control, during which the saturated state occurs, is calculated as the corrective manipulated variable, and the feedforward manipulated variable is corrected using the corrective manipulated variable in a late phase of the control. This increases a response speed in the late phase of the control to recover the response delay that has occurred in the early phase of the control, thus enabling electric VTC 113 to converge to a desired angle within time equivalent to the time required in the case in which no saturation takes place.

In Japanese Laid-Open Patent Application Publication No. 2009-215955, as already described, the correction of a feedforward manipulated variable as described in the present embodiment is not implemented, and therefore, a response delay cannot be eliminated. Furthermore, in the case in which feedback control is carried out from the beginning, an excessive integration portion results and the output of a limit manipulated variable in the late phase of control is prolonged with a consequent overshoot, making it difficult to accomplish stable convergence to a desired angle.

According to the present embodiment, the correction of a feedforward manipulated variable based on the FF manipulated variable correction amount is carried out for a period of time based on an integrated value of saturating amounts, so that it is possible to solve the problem in the conventional art and to permit convergence to a desired angle while suppressing a response delay and an overshoot.

According to the first embodiment described above, the correction based on an integrated value of saturating amounts is maximized to increase a response speed, thus permitting prompt recovery from a delay in the early phase of control. On the other hand, an actual response speed may become excessively high due to variations in the VTC dynamic characteristic or the like.

Figure 11:
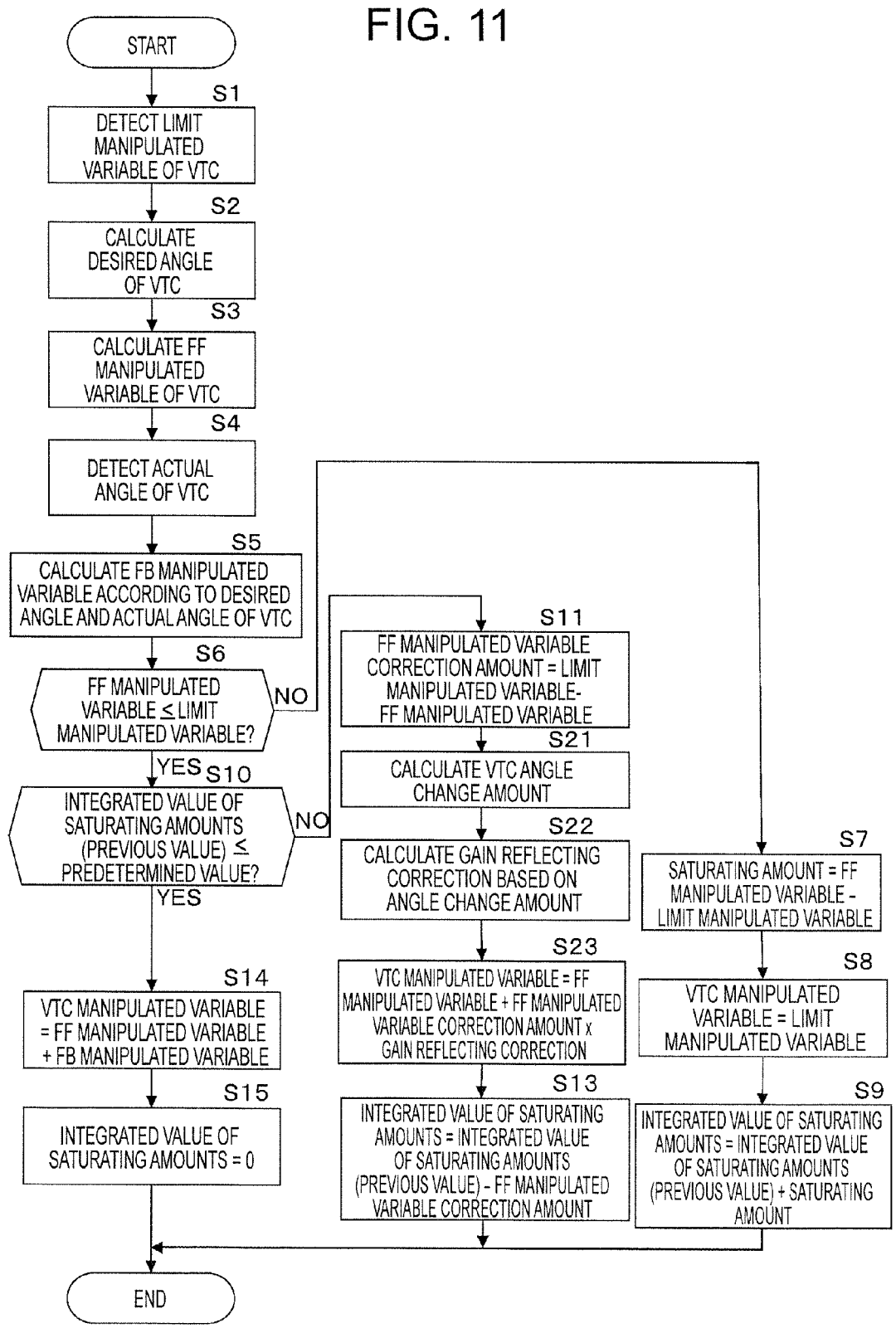
FIG. 11 is a flowchart of a second embodiment of the valve timing control by the variable valve timing mechanism.

FIG. 11 illustrates a flowchart of a second embodiment, in which electric VTC 113 is controlled while changing the FF manipulated variable correction amount according to a response speed, taking the above aspects into account.

Step 1 to step 11 are the same as those in the first embodiment. After an integrated value of saturating amounts is calculated in the saturated state, a feedforward corrective manipulated variable is calculated in step 11.

Subsequently, in step 21, the amount of change in the angle (rotation phase) of electric VTC 113, i.e., the actual response speed, is calculated. More specifically, a value to be obtained by subtracting a previous actual VTC angle from a current actual VTC angle is calculated as the amount of change in angle. The amount of change in angle is calculated by, for example, using an actual angle detected by sensors, namely, the crank angle sensor and the cam sensor, or by estimating an actual angle from the physical property of the VTC set beforehand in the control unit and the history of manipulated variables, to thereby calculate the amount of change.

In step 22, a gain reflecting a correction amount is calculated based on the amount of change in angle. In this case, the gain reflecting a correction amount is to be calculated to have a smaller value as the amount of change in angle increases.

In step 23, the VTC manipulated variable is calculated by adding a value, which is obtained by multiplying the correction amount calculated in step 11 by the gain reflecting a correction amount calculated in step 22, to a feedforward manipulated variable.

In step 13 to step 15, as with the first embodiment, the FF manipulated variable correction amount calculated in step 11 is repeatedly subtracted from the integrated value of saturating amounts until the subtracted integrated value of saturating amounts is the predetermined value or less, and then the feedback control based on the feedback correction amount is started.

According to the second embodiment, when correcting a feedforward manipulated variable based on an integrated value of saturating amounts, the amount of change in angle of the VTC is taken into account to implement the correction, and the value obtained by using a smaller corrective gain for the multiplication as the amount of change in angle increases is used to carry out the correction. This makes it possible to achieve stable convergence to a desired angle while restraining the response speed from becoming excessive.

Figure 12:
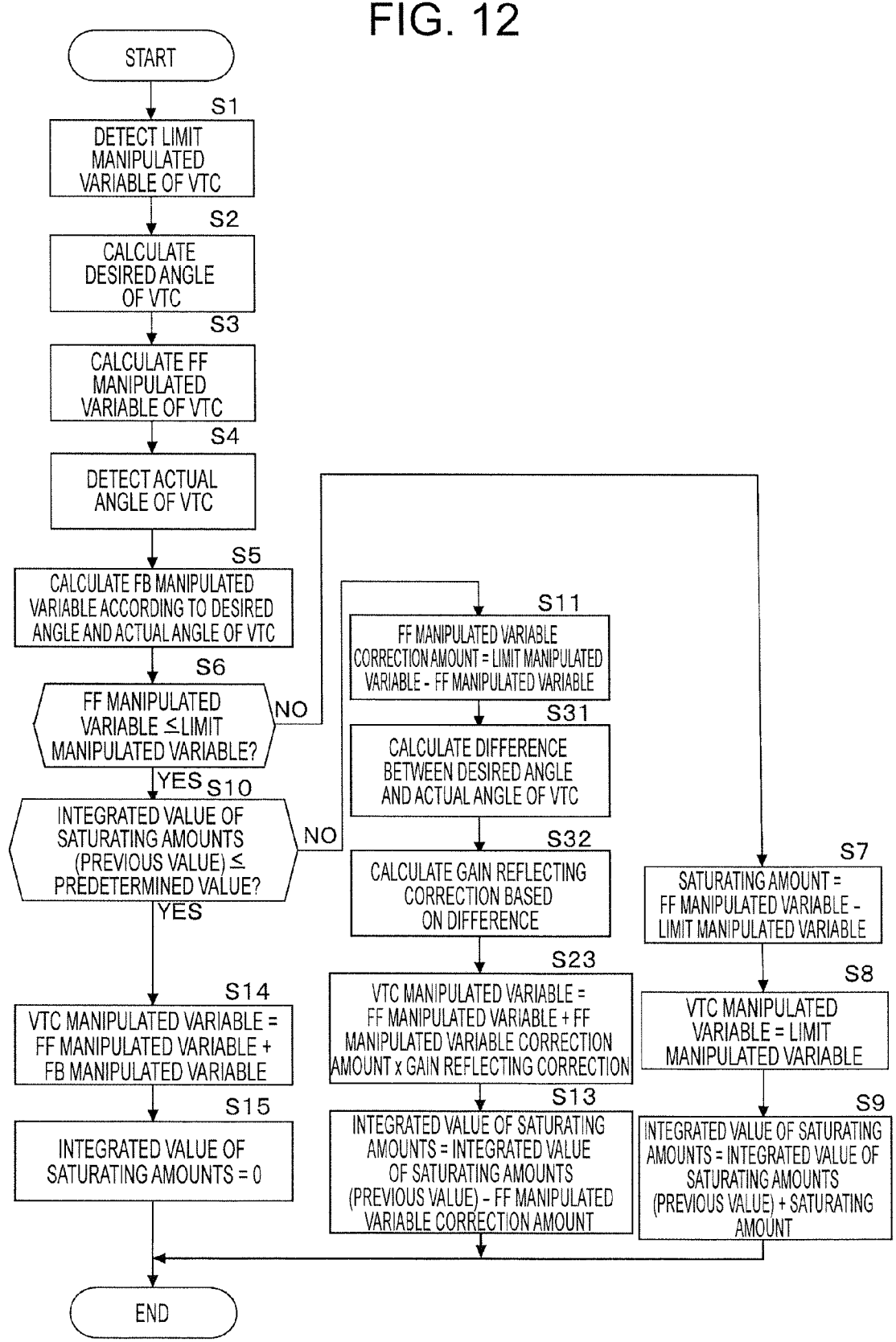
FIG. 12 is a flowchart of a third embodiment of the valve timing control by the variable valve timing mechanism.

FIG. 12 is a flowchart illustrating a third embodiment in which electric VTC 113 is controlled by changing the FF manipulated variable correction amount according to the difference between a desired angle of the VTC and an actual angle.

Step 1 to step 11 are the same as those in the first and the second embodiments.

Subsequently, in step 31, the amount of the difference between the desired angle and the actual angle of electric VTC 113 is calculated. As with the second embodiment, an actual angle detected by the sensors (the crank angle sensor and the cam sensor) may be used as the actual angle, or the actual angle may be estimated from the physical property of the VTC set beforehand in the control unit and the history of manipulated variables, to thereby calculate the amount of change.

In step 32, the gain reflecting a correction amount is calculated based on the amount of the difference. In this case, the gain reflecting the correction amount is to be calculated to have a smaller value as the amount of the difference decreases.

Thereafter, as with the second embodiment, the VTC manipulated variable is calculated in step 23 by adding the value, which is obtained by multiplying the correction amount calculated in step 11 by the gain reflecting the correction amount calculated in step 32, to the feedforward manipulated variable.

In step 13 to step 15, as with the first and the second embodiments, the correction amount calculated in step 11 is repeatedly subtracted from the integrated value of saturating amounts, and when the subtracted integrated value of saturating amounts is the predetermined value or less, the feedback control based on a feedback correction amount is started.

According to the third embodiment, when correcting a feedforward manipulated variable based on an integrated value of saturating amounts, the amount of the difference between a desired angle and an actual angle of the VTC is taken into account to implement the correction, and the value obtained by using a smaller corrective gain for the multiplication as the amount of the difference decreases is used to carry out the correction. This makes it possible to achieve stable convergence to a desired angle while restraining the response speed from becoming excessively high, as with the second embodiment.

Normally, for battery voltage Vb, a value obtained by filtering an A/D value to remove noises is used. However, in the abovementioned embodiments, when detecting battery voltage Vb as an outputtable limit manipulated variable of electric VTC 113, the value of battery voltage Vb after subjected to the filtering does not adequately reproduce the fluctuations in voltage at a start. In other words, a voltage that has been smoothed by regular filtering is inconveniently detected as a value indicating a slightly larger outputtable limit manipulated variable of electric VTC 113 than it should be. As a result, a smaller saturating amount (=feedforward manipulated variable–limit manipulated variable) than it should be will be calculated, possibly leading to an insufficient correction amount of a feedforward manipulated variable based on an integrated value of saturating amounts, thus failing to achieve adequate recovery from a response delay.

Figure 13:
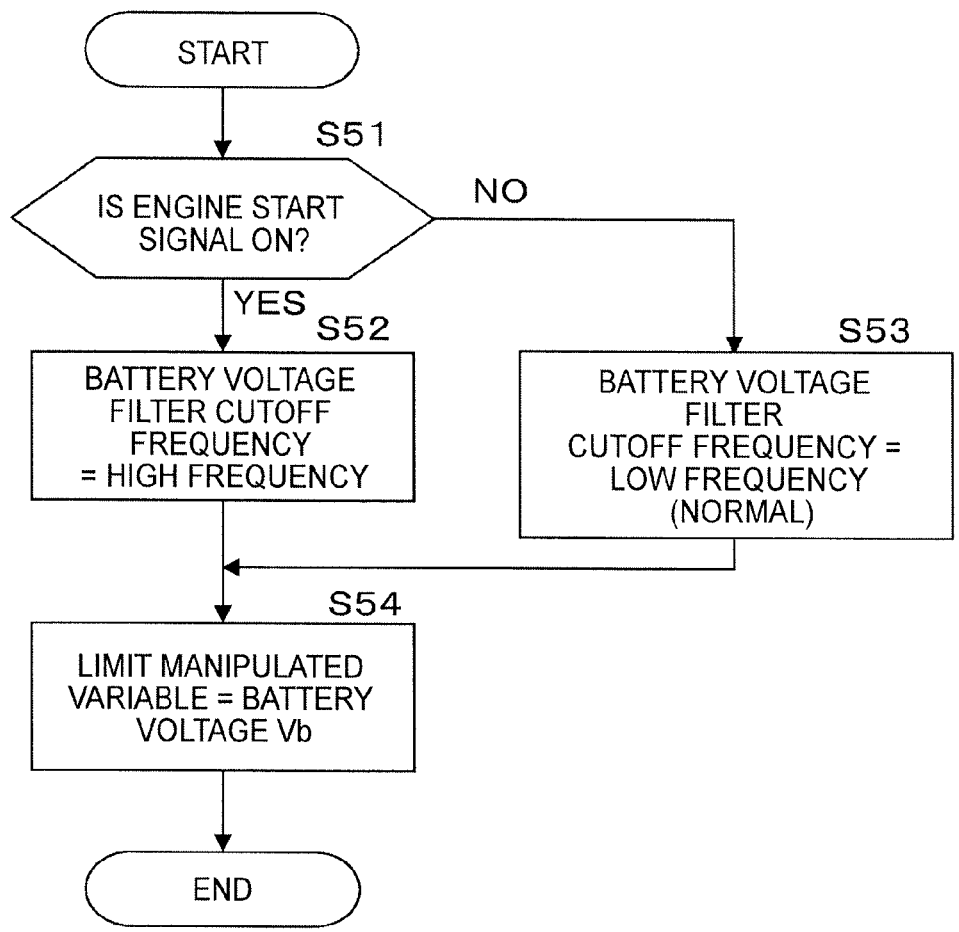
FIG. 13 is a flowchart of a fourth embodiment in which a limit manipulated variable of the valve timing control by the variable valve timing mechanism is calculated.

FIG. 13 is a flowchart illustrating the process for calculating a limit manipulated variable by taking the aforesaid aspects into account.

In step 51, it is determined whether an engine start signal (start switch) is in ON-state.

If it is determined that the engine start signal (start switch) is ON-state to start the engine, then the process proceeds to step 52 in which the cutoff frequency of a battery voltage filter is set to a high frequency that is higher than a frequency in a normal operation.

Meanwhile, if it is determined that the engine start signal (start switch) is OFF-state and the engine is already in operation, then the process proceeds to step 53 in which the cutoff frequency of the battery voltage filter is set to a low frequency used in the normal operation.

In step 54, the filtered battery voltage Vb for which the cutoff frequency has been set in step 52 or step 53 is set as the outputtable limit manipulated variable of electric VTC 113.

Figure 14:
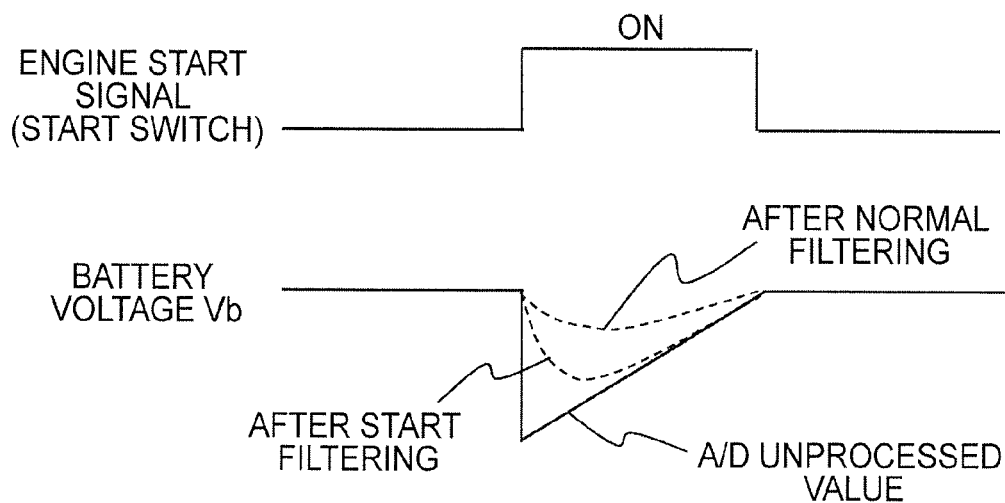
FIG. 14 is a time chart illustrating the values of a battery voltage Vb in the fourth embodiment.

Thus, as illustrated in FIG. 14, a battery voltage that has been filtered to have a high cutoff frequency at the time of starting the engine is detected as the limit manipulated variable of electric VTC 113, thereby making it possible to use a limit manipulated variable that is close to an A/D value that fluctuates and significantly decreases. This restrains an inadequate correction of a feedforward manipulated variable based on an integrated value of saturating amounts, thus permitting successful recovery from a response delay.

The present invention can be applied also to a variable valve mechanism that varies the valve characteristic of an exhaust valve.

The entire contents of Japanese Patent Application No. 2012-200979 filed on Sep. 12, 2012, on which priority is claimed, are incorporated herein by reference.

While only select embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and it is not for the purpose of limiting the invention, the invention as claimed in the appended claims and their equivalents.

What is claimed is:

1. A control apparatus for a variable valve mechanism that varies a valve characteristic of an engine valve, comprising:
    a feedforward manipulated variable calculating unit that calculates a feedforward manipulated variable according to a dynamic characteristic of the variable valve mechanism;
    an actual manipulated variable calculating unit that calculates an actual manipulated variable that can be output by the variable valve mechanism;
    a corrective manipulated variable calculating unit that calculates a corrective manipulated variable for correcting a difference between the calculated feedforward manipulated variable and the actual manipulated variable while changing the valve characteristic of the engine valve by controlling the variable valve mechanism; and
    a feedforward manipulated variable correcting unit that corrects the feedforward manipulated variable according to the corrective manipulated variable after the corrective manipulated variable is calculated;
    wherein the corrective manipulated variable calculating unit calculates, as the corrective manipulated variable, an integrated value of saturating amount obtained from the actual and feedforward manipulated variables when the feedforward manipulated variable differs in a particular way from the actual manipulated variable.

2. The control apparatus for a variable valve mechanism according to claim 1, further comprising:
    an actual response speed acquiring unit that acquires an actual response speed of the variable valve mechanism,
    wherein the feedforward manipulated variable correcting unit changes the calculated corrective manipulated variable according to the acquired actual response speed and corrects the feedforward manipulated variable according to the changed corrective manipulated variable.

3. The control apparatus for a variable valve mechanism according to claim 1, further comprising:
    an actual operating position acquiring unit that acquires an actual operating position of the variable valve mechanism,
    wherein the feedforward manipulated variable correcting unit changes the calculated corrective manipulated variable according to the acquired actual operating position and corrects the feedforward manipulated variable according to the changed corrective manipulated variable.

4. The control apparatus for a variable valve mechanism according to claim 1,
    wherein the actual manipulated variable calculating unit calculates, as the actual manipulated variable, a manipulated variable corresponding to a voltage of a battery that supplies electric power to the variable valve mechanism.

5. The control apparatus for a variable valve mechanism according to claim 4,
    wherein the voltage of a battery used to calculate the actual manipulated variable is a voltage that has been filtered by a battery voltage filter having a characteristic in which a cutoff frequency at the time of starting the engine is higher than a cutoff frequency in a normal operation.

6. The control apparatus for a variable valve mechanism according to claim 1,
    wherein the variable valve mechanism is a variable valve timing mechanism that varies a valve timing of an engine valve.

7. A control apparatus for a variable valve mechanism that varies a valve characteristic of an engine valve, comprising:
    a feedforward manipulated variable calculating unit that calculates a feedforward manipulated variable according to a dynamic characteristic of the variable valve mechanism;
    an actual manipulated variable calculating unit that calculates an actual manipulated variable that can be output by the variable valve mechanism;
    a corrective manipulated variable calculating unit that calculates a corrective manipulated variable for correcting a difference between the calculated feedforward manipulated variable and the actual manipulated variable while changing the valve characteristic of the engine valve by controlling the variable valve mechanism; and a feedforward manipulated variable correcting unit that corrects the feedforward manipulated variable according to the corrective manipulated variable after the corrective manipulated variable is calculated;

wherein the corrective manipulated variable calculating unit calculates, as the corrective manipulated variable, an integrated value of saturating amount obtained by subtracting the actual manipulated variable from the feedforward manipulated variable in the case in which the feedforward manipulated variable exceeds the actual manipulated variable.

8. The control apparatus for a variable valve mechanism according to claim 7, wherein the corrective manipulated variable calculating unit continues to calculate a feedforward manipulated variable corrective amount as long as a value, which is obtained by subtracting an integrated value of the feedforward manipulated variable corrective amount from the integrated value of saturating amount, exceeds a predetermined value while calculating a value, which is obtained by subtracting the feedforward manipulated variable from the actual manipulated variable, as the feedforward manipulated variable corrective amount after the calculated feedforward manipulated variable becomes the actual manipulated variable or less.

9. The control apparatus for a variable valve mechanism according to claim 8, further comprising:

an actual operating position acquiring unit that acquires an actual operating position of the variable valve mechanism;

a feedback manipulated variable calculating unit that calculates a feedback manipulated variable according to a difference between a desired position and the actual operating position of the variable valve mechanism; and a manipulated variable calculating unit that calculates a manipulated variable of the variable valve mechanism according to the calculated feedforward manipulated variable and the feedback manipulated variable after a value obtained by subtracting an integrated value of the feedforward manipulated variable corrective amount from the integrated value of saturating amount becomes the predetermined value or less.

10. A control apparatus for a variable valve mechanism that varies a valve characteristic of an engine valve, comprising:

feedforward manipulated variable calculating means that calculates a feedforward manipulated variable according to a dynamic characteristic of the variable valve mechanism;

actual manipulated variable calculating means that calculates an actual manipulated variable that can be output by the variable valve mechanism;

corrective manipulated variable calculating means that calculates a corrective manipulated variable for correcting a difference between the calculated feedforward manipulated variable and the actual manipulated variable while changing the valve characteristic of the engine valve by controlling the variable valve mechanism; and feedforward manipulated variable correcting means that corrects the feedforward manipulated variable according to the corrective manipulated variable after the corrective manipulated variable is calculated wherein the corrective manipulated variable calculating means calculates, as the corrective manipulated variable, an integrated value of saturating amount obtained from the actual and feedforward manipulated variables when the feedforward manipulated variable differs in a particular way from the actual manipulated variable.

11. A control method for a variable valve mechanism that varies a valve characteristic of an engine valve, comprising the steps of:

calculating a feedforward manipulated variable according to the dynamic characteristic of the variable valve mechanism;

calculating an actual manipulated variable that can be output by the variable valve mechanism;

calculating a corrective manipulated variable for correcting a difference between the calculated feedforward manipulated variable and the actual manipulated variable while changing the valve characteristic of the engine valve by controlling the variable valve mechanism; and correcting the feedforward manipulated variable according to a corrective manipulated variable after the corrective manipulated variable is calculated wherein the step of calculating the corrective manipulated variable includes calculating, as the corrective manipulated variable, an integrated value of saturating amount obtained from the actual and feedforward manipulated variables when the feedforward manipulated variable differs in a particular way from the actual manipulated variable.

12. The control method for a variable valve mechanism according to claim 11, further comprising:

a step of acquiring an actual operating position of the variable valve mechanism, wherein the step of correcting the feedforward manipulated variable changes the calculated corrective manipulated variable according to the acquired actual operating position and corrects the feedforward manipulated variable according to the changed corrective manipulated variable.

13. The control method for a variable valve mechanism according to claim 11, further comprising:

a step of acquiring an actual response speed of the variable valve mechanism, wherein the step of correcting the feedforward manipulated variable changes the calculated corrective manipulated variable according to the acquired actual response speed and corrects the feedforward manipulated variable according to the changed corrective manipulated variable.

14. The control method for a variable valve mechanism according to claim 11, wherein the step of calculating the actual manipulated variable calculates, as the actual manipulated variable, a manipulated variable corresponding to a voltage of a battery that supplies electric power to the variable valve mechanism.

15. The control method for a variable valve mechanism according to claim 14, wherein the voltage of a battery used to calculate the actual manipulated variable is a voltage that has been filtered by a battery voltage filter having a characteristic in which a cutoff frequency at a start is higher than a cutoff frequency in a normal operation.

16. A control method for a variable valve mechanism that varies a valve characteristic of an engine valve, comprising the steps of:

calculating a feedforward manipulated variable according to the dynamic characteristic of the variable valve mechanism;

calculating an actual manipulated variable that can be output by the variable valve mechanism;

calculating a corrective manipulated variable for correcting a difference between the calculated feedforward manipulated variable and the actual manipulated variable while changing the valve characteristic of the engine valve by controlling the variable valve mechanism; and correcting the feedforward manipulated variable according to a corrective manipulated variable after the corrective manipulated variable is calculated;

wherein the step of calculating the corrective manipulated variable calculates, as the corrective manipulated variable, an integrated value of saturating amount obtained by subtracting the actual manipulated variable from the feedforward manipulated variable in the case in which the feedforward manipulated variable exceeds the actual manipulated variable.

17. The control method for a variable valve mechanism according to claim 16, wherein the step of calculating the corrective manipulated variable continues to calculate a feedforward manipulated variable corrective amount as long as a value, which is obtained by subtracting an integrated value of the feedforward manipulated variable corrective amount from the integrated value of saturating amount, exceeds a predetermined value while calculating a value, which is obtained by subtracting the feedforward manipulated variable from the actual manipulated variable, as the feedforward manipulated variable corrective amount after the calculated feedforward manipulated variable becomes the actual manipulated variable or less.

18. The control method for a variable valve mechanism according to claim 17, further comprising the steps of:

acquiring an actual operating position of the variable valve mechanism;

calculating a feedback manipulated variable according to a difference between a desired position and the actual operating position of the variable valve mechanism; and calculating a manipulated variable of the variable valve mechanism according to the calculated feedforward manipulated variable and the feedback manipulated variable after a value obtained by subtracting an integrated value of the corrective manipulated variable from the integrated value of saturating amount becomes a predetermined value or less.

\* \* \* \* \*